US006804310B1

(12) United States Patent
Li et al.

(10) Patent No.: US 6,804,310 B1
(45) Date of Patent: Oct. 12, 2004

(54) DECISION FEEDBACK LOOP APPARATUS AND METHOD FOR CHANNEL ESTIMATION AND DE-ROTATION USING BURST PILOT BITS

(75) Inventors: Xiao Bo Li, Santa Clara, CA (US); David Lam, Fremont, CA (US); Huoy-Bing Lim, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 795 days.

(21) Appl. No.: 09/705,665

(22) Filed: Nov. 3, 2000

(51) Int. Cl.[7] .............................................. H04L 27/14
(52) U.S. Cl. ...................................... 375/316; 375/350
(58) Field of Search ................................ 375/148, 350, 375/233, 342, 232, 147, 316, 340, 362–366; 370/335, 441, 525, 528, 491; 455/452.1

(56) References Cited

U.S. PATENT DOCUMENTS

| | | | | |
|---|---|---|---|---|
| 5,432,816 A | 7/1995 | Gozzo | ......................... | 375/232 |
| 5,513,215 A | 4/1996 | Marchetto et al. | ........... | 375/233 |
| 5,790,598 A | 8/1998 | Moreland et al. | ............ | 345/233 |
| 5,930,296 A * | 7/1999 | Kot | .............................. | 375/233 |
| 6,175,588 B1 * | 1/2001 | Visotsky et al. | ............. | 375/148 |
| 6,192,040 B1 * | 2/2001 | Jalloul et al. | ................ | 370/335 |
| 6,480,554 B1 * | 11/2002 | Toskala et al. | .............. | 375/340 |
| 6,580,772 B2 * | 6/2003 | Pajukoski | .................... | 375/350 |
| 6,603,823 B1 * | 8/2003 | Yellin et al. | ................. | 375/340 |
| 6,654,429 B1 * | 11/2003 | Li | ............................... | 375/316 |

OTHER PUBLICATIONS

Andoh et al., Channel Estimation Using Time Multiplexed Pilot Symbols for Coherent Rake Combining for DS–CDMA Mobile Radio, May 1997, IEEE, pp. 954–958.*

* cited by examiner

*Primary Examiner*—Jean B. Corrielus
*Assistant Examiner*—Khanh Cong Tran
(74) *Attorney, Agent, or Firm*—Aaron Waxler

(57) ABSTRACT

A decision feedback loop for a receiver for channel estimation and de-rotation of complex input symbols derived from a sampled information signal received via a channel which contains data organized into successive time slots, is configured to retrain and reinitialize the loop during each slot in order to mitigate slot to slot propagation of the estimation error.

8 Claims, 4 Drawing Sheets

DECISION FEEDBACK LOOP APPARATUS AND METHOD FOR CHANNEL ESTIMATION AND DE-ROTATION USING BURST PILOT BITS

BACKGROUND OF THE INVENTION

1. Field of the Invention

The present invention relates generally to telecommunications systems, for example wireless digital cellular systems, employing complex or quadrature modulated information signals containing data organized into successive time slots, each slot containing a series of pilot bits and a series of data bits, and more specifically to an apparatus and method for channel estimation and de-rotation of such an information signal received via a channel.

2. Description of the Related Art

In planned third generation digital wireless cellular systems known as Uniform Mobile Telephone System (UMTS), Wideband Code Division Multiple Access (W-CDMA), and Third Generation (e.g. 3G Partnership Project) spread spectrum information signals are used which contain data grouped into slots, each slot consisting of a predetermined series of $N_{pilot}$ pilot bits in a first portion of the slot and a series of $N_{data}$ data bits in the second portion of the slot. It is known to use various types of filtering schemes, ranging from simple to complex, to achieve channel estimation and de-rotation of a despread received spread spectrum information signal by synchronizing with the pilot bits. The nature of the estimation error achieved with prior art filtering schemes varies, but generally the error propagates from slot, sometimes increasing over time.

While decision feedback loops are known for other purposes, the prior art has not considered the possibility of using a decision feedback loop for channel estimation and de-rotation of a spread spectrum signal received via a channel.

OBJECT AND SUMMARY OF THE INVENTION

It is an object of the present invention to provide a decision feedback loop apparatus and method for a receiver for channel estimation and de-rotation of a received signal. It is a further object that the decision feedback loop is implemented in a manner to mitigate propagation of the estimation error from slot to slot.

This and other objects of the present invention are satisfied by a decision feedback loop which uses the known sequence of pilot bits to initialize and train the feedback loop during each slot. This continued sloe by slot re-initialization and re-training prevents the estimation error in one slot from propagating to the next.

In accordance with the invention, a decision feedback loop apparatus for a receiver for channel estimation and de-rotation of complex input symbols derived from a sampled information signal received via a channel, which information signal contains data organized into successive time slots, each slot containing a predetermined series of pilot bits during a first portion of the slot and a series of data bits during a second portion of the slot, comprises a first multiplier for multiplying the complex input symbols with estimated conjugate channel coefficients, which are derived from a feedback signal, to form complex soft symbols to be used for channel decoding, a hard decision device for forming complex hard symbols from the complex soft symbols, a pilot generator for generating a series of complex pilot symbols corresponding to the predetermined series of pilot bits in the information signal, and a second multiplier for multiplying a first signal at a first input, which is derived from the complex input signal, with a second signal at a second input to form a feedback signal at an output. The invention is characterized in that the second signal is derived from the complex pilot symbols during the first portion of the slot and from the complex hard symbols during the second portion of the slot.

Similarly, in accordance with the invention, a decision feedback loop method for a receiver for channel estimation and de-rotation of complex input symbols derived from a sampled information signal received via a channel, which information signal contains data organized into successive time slots, each slot containing a predetermined series of pilot bits during a first portion of the slot and a series of data bits during a second portion of the slot, comprises multiplying the complex input symbols with estimated conjugate channel coefficients, which are derived from a feedback signal, to form complex soft symbols to be used for channel decoding, forming complex hard symbols from the complex soft symbols, generating a series of complex pilot symbols corresponding to the predetermined series of pilot bits in the information signal, and multiplying a first signal, which is derived from the complex input signal, with a second signal to form a feedback signal. The inventive method is characterized by the act of deriving the second signal from the complex pilot symbols during the first portion of the slot and from the complex hard symbols during the second portion of the slot.

Another aspect of the invention is that the estimated channel coefficients are derived by applying a filter to the feedback signal.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 4:
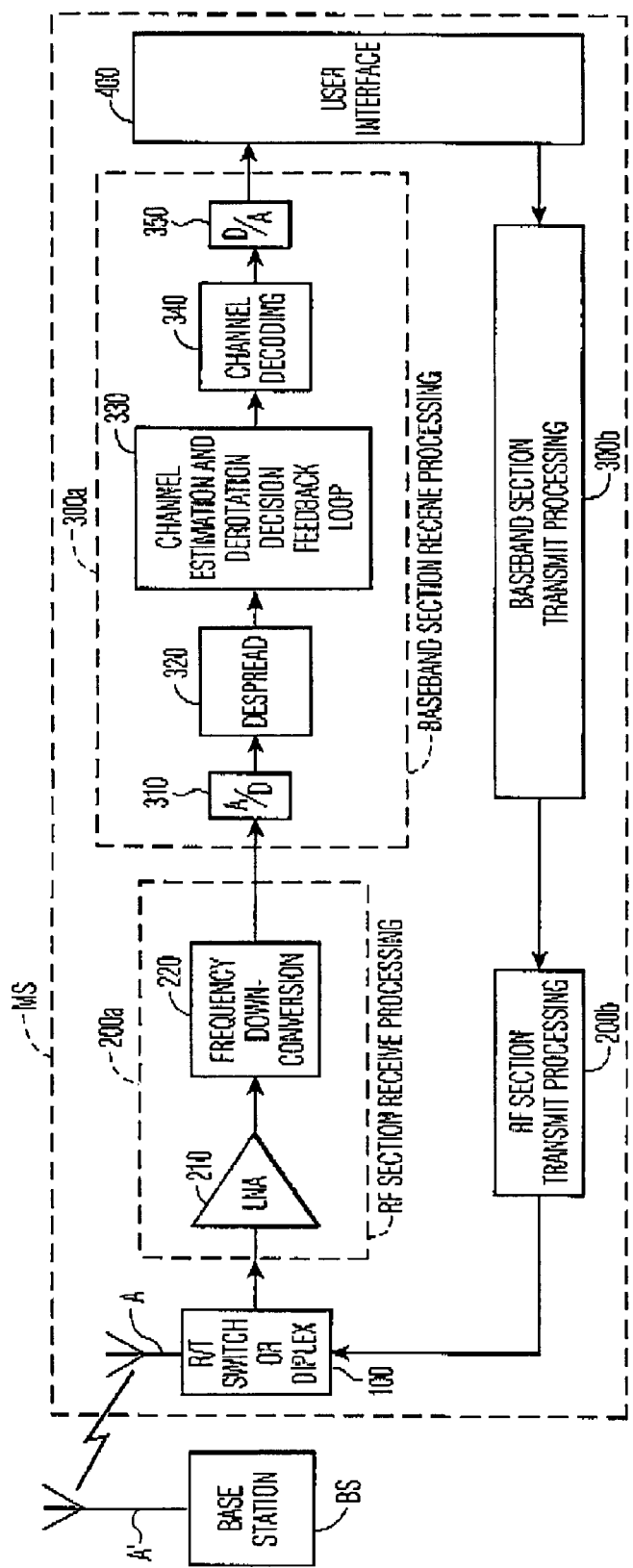
FIG. 4 shows a wireless telecommunications system including a mobile station having a channel estimation and de-rotation decision feedback loop in accordance with the invention.

Referring first to FIG. 4 of the drawing for the purpose of orientation, there is shown a mobile station MS transceiver in communication with a base station BS of a wireless cellular telecommunication system, e.g. of the UMTS, W-CDMA, 3GPP types employing spread spectrum signals transmitted and received via the antennae A', A. At the functional level of detail shown in FIG. 4, mobile station MS is conventional including a receive/transmit switch or diplexer 100 coupling antenna A to the input of RF receiving apparatus, including a cascade of a RF section receive processing block 200a and a baseband section receive processing block 300a, and also coupling antenna A to the output of RF transmitting apparatus, including a cascade of a baseband section transmit processing block 300b and a RF section transmit processing block 200b.

RF section receive processing block 200a includes a cascade of a low noise amplifier 210 and frequency down-converter 220 for conversion from RF to baseband, e.g. a direct conversion quadrature mixer (not shown), and baseband section receive processing block 300a includes a cascade of an analog to digital converter 310, a complex despreader 320 for applying a despreading code, a channel estimation and de-rotation decision feedback loop 330, a channel decoder 340 having a digital output for received decoded data signals, and a digital to analog converter 350 for producing an analog output e.g. representing received decoded voice signals. These digital and analog outputs are provided to a user interface 400 for use by and/or sensory stimulation of a user, and the user interface provides to analog and digital inputs of baseband section transmit processing block 300b user responsive voice and/or data signals, respectively.

Baseband section transmit processing block 300b digitally encodes and applies a spreading code to the voice signals, after an analog to digital conversion, and also encodes and spreads the data signals, converts the encoded and spread signals to digital form, and supplies these encoded and spread signals, after a digital to analog conversion, to RF section transmit processing block 200b for power amplification and frequency upconversion to RF.

Figure 5:
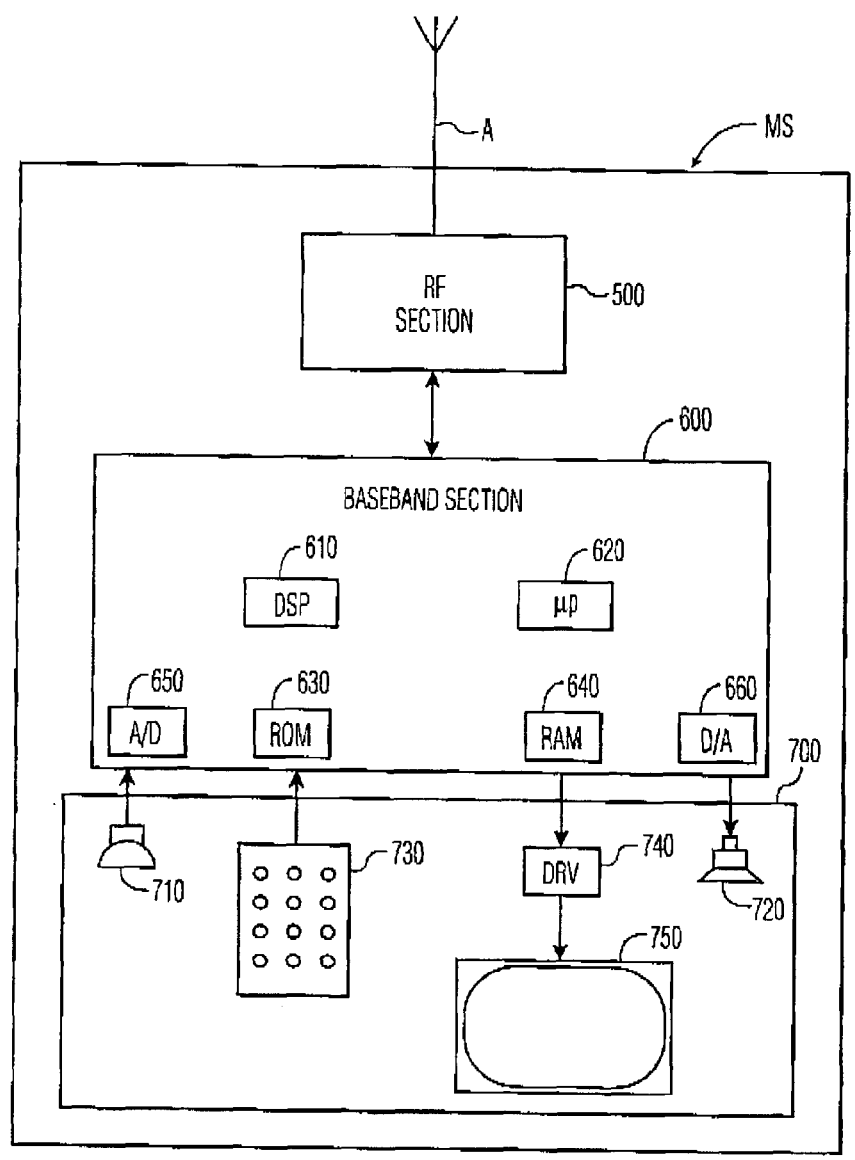
FIG. 5 shows a wireless handset or mobile station for incorporating the decision feedback loop for receiving purposes.

For further orientation, reference is made to FIG. 5 of the drawing which shows the mobile station MS as including the antenna A, an RF section 500 (which implements the receive transmit switch or diplexer 100 and RF section receive and transmit processing 200a, 200b of FIG. 4), a baseband section (which implements baseband section receive and transmit processing 300a, 300b of FIG. 4), and a user interface section (which implements user interface 400 of FIG. 4). Baseband section 600 includes digital signal processor (DSP) 610, microprocessor (IP) 120, read only memory (ROM) 630, random access memory (RAM)640, analog to digital converter (A/D) 650, and digital to analog converter (D/A) 660. User interface section 700 includes microphone 710, speaker 720, keypad 730, and a display driver 740 which drives an LCD display 750.

The present invention pertains particularly to channel estimation and de-rotation decision feedback loop 330 of FIG. 4 which is specially configured for slot by slot re-initialization and re-training. As is conventional, the channel estimation and derotation functionality is implemented by DSP operating on program instructions stored in ROM 630.

Figure 2:
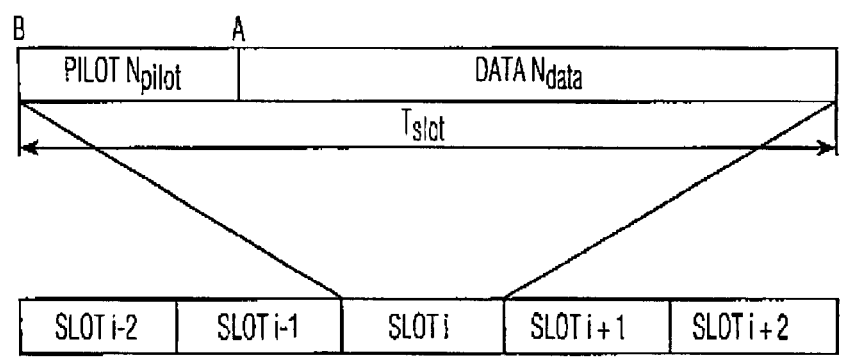
FIG. 2 shows the time slot structure of the information signal.

The relevant slot structure, as shown in FIG. 2, is seen to comprise a series of time slots, e.g. i−2, 1−1, i, i+1, i+2, each consisting of a predetermined sequence of $N_{pilot}$ pilot symbols during a first portion of the slot followed by a larger number, $N_{data}$, of data symbols during a second portion of the slot.

Figure 1:
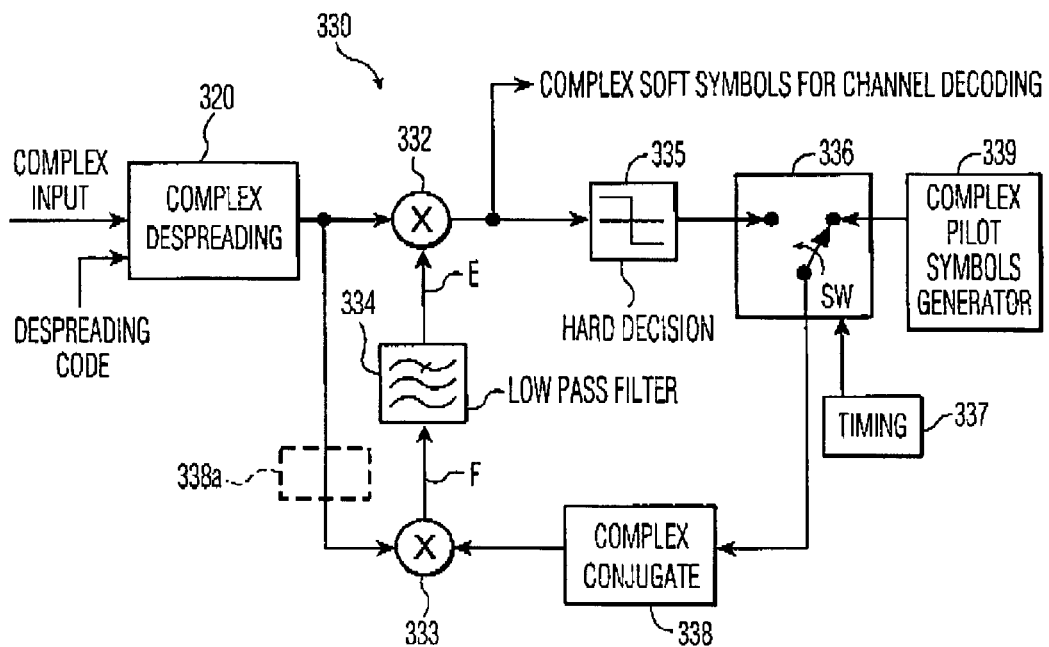
FIG. 1 shows a simplified decision feedback loop for channel estimation and de-rotation of complex input symbols derived from a sampled information signal in accordance with the present invention.

Channel estimation and de-rotation decision feedback loop 330 is shown in simplified form in FIG. 1 in conjunction with complex despreader 320 which supplies complex input symbols to a first inputs of first and second multipliers 332, 333 of feedback loop 330. First multiplier 332 also receives at a second input estimated complex conjugate channel coefficients E, and produces at its output complex soft symbols supplied to channel decoder 340 (FIG. 5) and also to a hard decision device 335 which converts the complex soft symbols to complex hard decisions. The output of hard decision device 335 is applied to one input of a selector device 336, shown as a switch, whose other input is fed by the output of complex pilot symbols generator 339, and whose output is coupled to a second input of second multiplier 333 via a complex conjugate device 338. Selector switch 336 is controlled by a timing device 337 such that the signal coupled to the second input of second multiplier 333 is derived from the complex pilot symbols output from generator 339 during the first portion of the slot and from the complex hard decisions output from hard decision device 335 during the second portion of the slot.

Optionally, complex conjugate device 338a may be utilized which is located in the path between the output of complex despreading device 320 and the first input of second multiplier 333 rather than locating complex conjugate device 338 in the path between the output of selector device 336 and the second input of multiplier 333. In either event, the output of second multiplier 333 is a feedback signal F which is applied to a low pass filter 334 whose output constitutes the estimated complex conjugate channel coefficients E applied to the second input of first multiplier 332.

Figure 3:
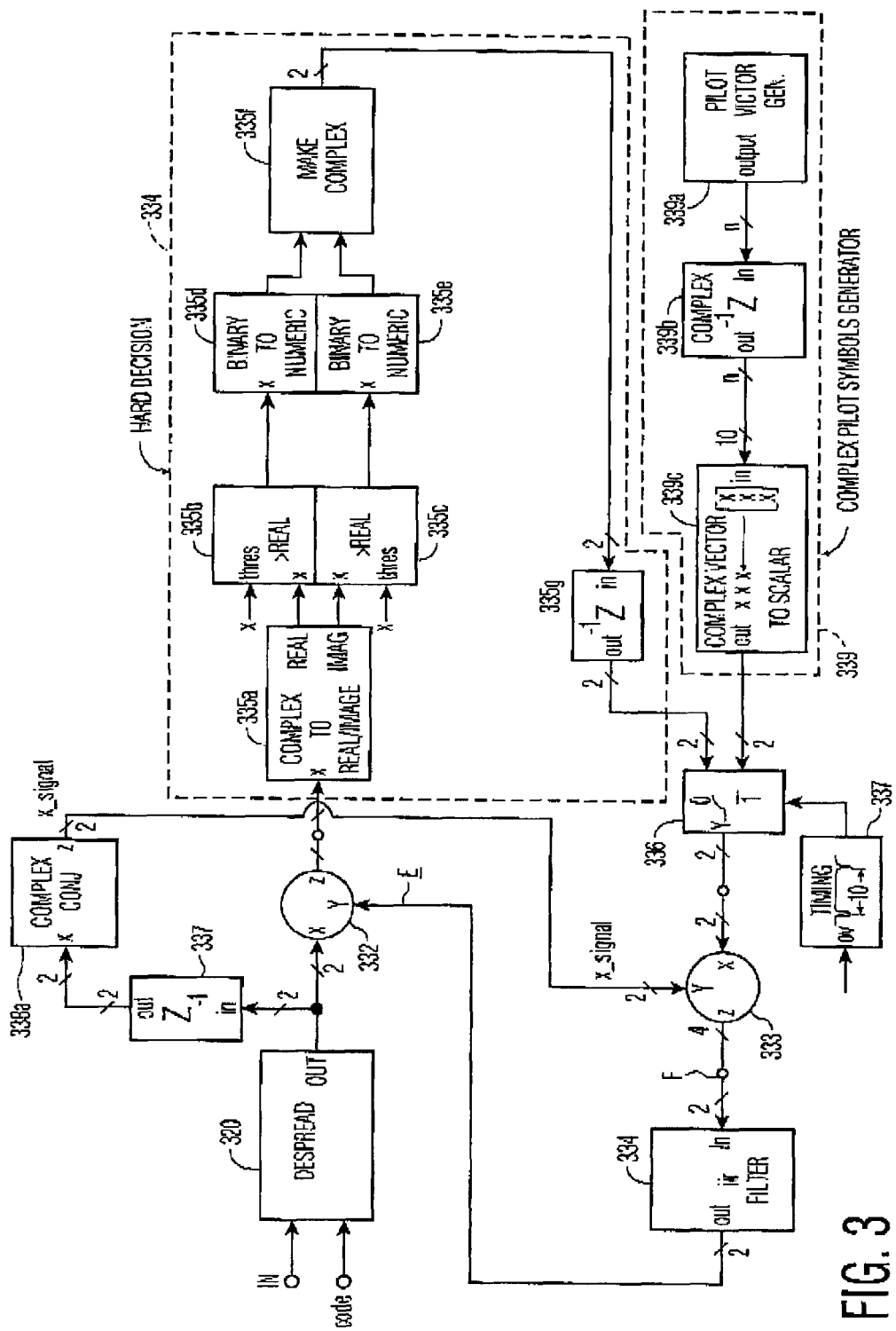
FIG. 3 shows a more detailed decision feedback loop which corresponds to an alternative embodiment to that shown in FIG. 1.

FIG. 3 illustrates channel estimation and de-rotation decision feedback loop 330 in more detail, utilizing the alternative in which the complex conjugate device appears intermediate the output of despreader 320 and the first input of second multiplier 337 after a one sampling interval delay 337. Hard decision device 334 is seen to comprise a complex to real/imaginary device having real and imaginary component outputs which are compared with a threshold of zero in comparators 330b and 330c respectively, to produce binary hard decisions. These binary hard decisions for the real and imaginary components are applied to binary to numeric converters 330d and 330e, respectively, the outputs of which feed device 330f for forming a complex numeric therefrom. The output of device 330f is applied to one input of selector device 336 via one sampling interval delay 330g, and the output of selector device feeds the second input of multiplier 333.

Complex pilot symbols generator 339 comprises a pilot vector generator 339a which generates at its output the known sequence of pilot symbols in the form of a complex vector. The output of generator 339a is applied to the input of a complex vector to scalar converter 339b via one sampling interval delay 339b, and the output of converter 339c forms the output of complex pilot symbols generator 339 which the other input of selector device 336.

Further, the low pass filter 334 between the output of second multiplier 333 and the input of first multiplier 332 is seen to be implemented by an infinite impulse response (iir) digital filter.

It should now be appreciated that the objects of the present invention have been satisfied by the present invention since the decision feedback loop will effectively retrain and reinitialize due to the introduction of the generated pilot sequence into the feedback loop during each slot for correlation with the received pilot sequence.

While the present invention has been described in particular detail, it should also be appreciated that numerous modifications are possible within the intended spirit and scope of the invention. In interpreting the appended claims it should be understood that:

a) the word "comprising" does not exclude the presence of other elements or acts than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A decision feedback loop apparatus for a receiver for channel estimation and de-rotation of complex input symbols derived from a sampled information signal received via a channel, which information signal contains data organized into successive time slots, each slot containing a predetermined series of pilot bits during a first portion of the slot and a series of data bits during a second portion of the slot, said apparatus comprising:

a first multiplier for multiplying the complex input symbols with estimated conjugate channel coefficients, which are derived from a feedback signal, to form complex soft symbols to be used for channel decoding;

a hard decision device for forming complex hard symbols from the complex soft symbols;

a pilot generator for generating a series of complex pilot symbols corresponding to the predetermined series of pilot bits in the information signal; and a second multiplier for multiplying a first signal at a first input, which is derived from the complex input signal, with a second signal at a second input to form the feedback signal at an output, wherein the second signal is derived from the complex pilot symbols during the first portion of the slot and from the complex hard symbols during the second portion of the slot.

2. The apparatus as claimed in claim 1, further comprising a filter for forming the estimated channel coefficients from the feedback signal.

3. The apparatus as claimed in claim 1, further comprising means for coupling the complex pilot symbols to the second input of the second multiplier during the first portion of the slot and for coupling the complex hard symbols to the second input of the second multiplier during the second portion of the slot.

4. The apparatus as claimed in claim 2, further comprising means for coupling the complex pilot symbols to the second input of the second multiplier during the first portion of the slot and for coupling the complex hard symbols to the second input of the second multiplier during the second portion of the slot.

5. A receiver including the apparatus as claimed in claim 1.

6. A mobile station including the receiver as claimed in claim 5.

7. A decision feedback loop method for a receiver for channel estimation and de-rotation of complex input symbols derived from a sampled information signal received via a channel, which information signal contains data organized into successive time slots, each slot containing a predetermined series of pilot bits during a first portion of the slot and a series of data bits during a second portion of the slot, said method comprising:

multiplying the complex input symbols with estimated conjugate channel coefficients, which are derived from a feedback signal, to form complex soft symbols to be used for channel decoding;

forming complex hard symbols from the complex soft symbols;

generating a series of complex pilot symbols corresponding to the predetermined series of pilot bits in the information signal;

multiplying a first signal, which is derived from the complex input signal, with a second signal to form the feedback signal; and deriving the second signal from the complex pilot symbols during the first portion of the slot and from the complex hard symbols during the second portion of the slot.

8. The method as claimed in claim 7, further comprising applying a filter to the feedback signal to form the estimated channel coefficients from the feedback signal.

\* \* \* \* \*